Patented Feb. 16, 1937

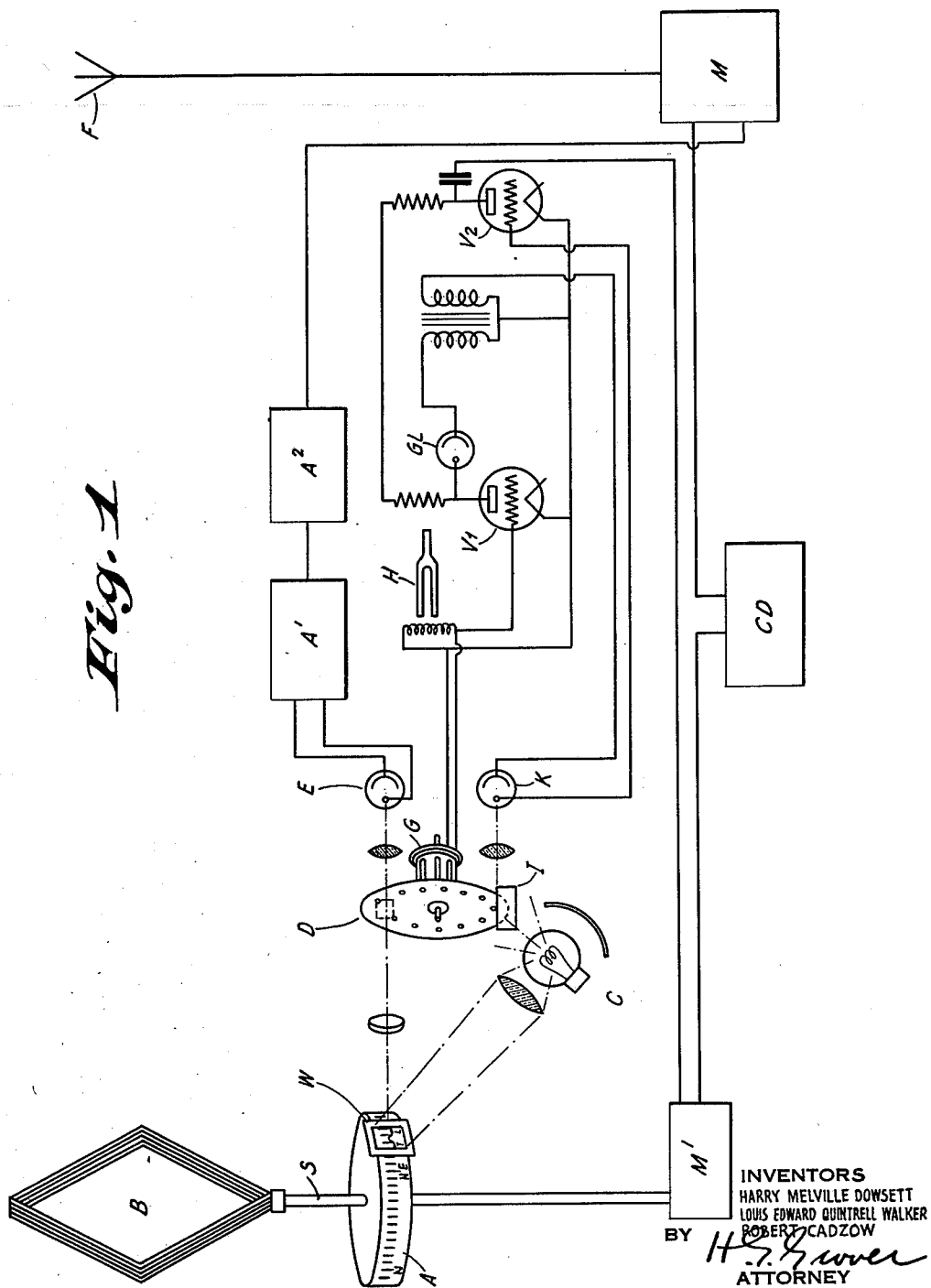

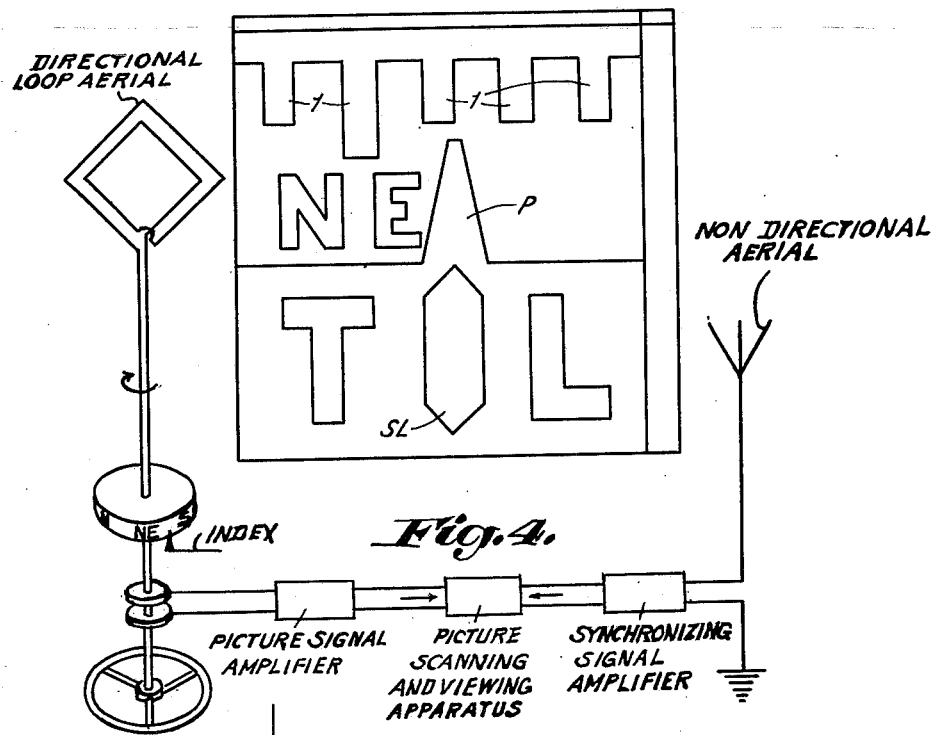
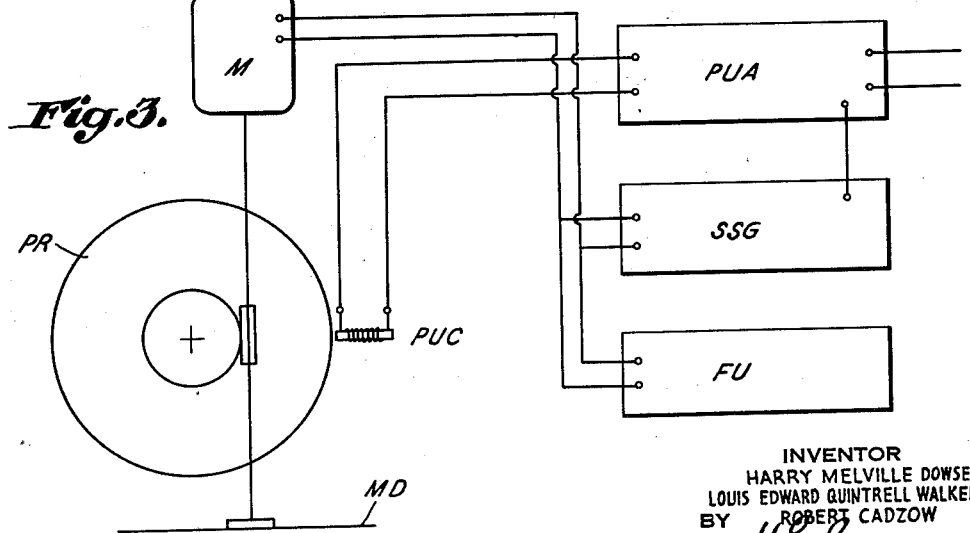

2,070,651

UNITED STATES PATENT OFFICE 2,070,651

WIRELESS DIRECTION FINDING SYSTEM

Harry Melville Dowsett and Louis Edward Quintrell Walker, London, and Robert Cadzow, Argyllshire, England, assignors to Electric and Musical Industries, Limited, a corporation of Great Britain Application May 24, 1933, Serial No. 672,552
In Great Britain May 26, 1932

16 Claims. (Cl. 250—11)

This invention relates to wireless direction finding systems and has for its object to provide a system whereby direction finding operations can be satisfactorily accomplished by relatively unskilled persons.

In wireless direction finding systems as at present in common use bearings are usually obtained by one of two different broad methods. Either the receiving station is provided with a rotatable frame aerial or a pair of fixed frames and a radiogoniometer the operator moving the rotating frame or the radiogoniometer search coil until a maximum audible signal or a minimum audible signal (as the case may be) is received; or transmitting stations of the rotating beacon type are employed the radiations from these stations being modulated with signals which will indicate at a receiver (which need not be a directional receiver) the direction of the transmitting station being received. As a rule in the latter type of system a characteristic signal is emitted from the transmitting station when the beam thereof passes through true north and the beam is rotated at a known predetermined rate so that the receiving station can tell the direction of the transmitter by observing the interval of time between the emission of the characteristic "north" signal and the instant when the rotating beam passes through the receiver. Whichever method of direction finding is employed the signals utilized are as a rule Morse code signals and a considerable amount of skill and judgment is required on the part of the wireless operators (particularly at receiving stations). The principal object of this invention is to reduce the amount of skill which is necessary for obtaining direction finding readings.

In its broad aspect the present invention accomplishes the above mentioned object by utilizing a television receiving set at a receiving station in a directional or bearing finding radio system and a corresponding television transmitting set at the transmitting station; the required indication of the direction of received signals and/or an indication identifying the beacon station being received being given by means of a television picture which is transmitted instead of the hitherto customary audible signal and the nature of which directly indicates at the receiver the direction of the station being received.

In one way of carrying out the invention an omni-directional wireless transmitting station for use for direction finding purposes transmits continuously a characteristic picture which may consist of or include the name of the beacon station in order that a receiving station may ascertain the bearing of this transmitting beacon station it is merely necessary to adjust the radiogoniometer or rotating frame aerial until the television picture received is at a maximum or a minimum intensity as the case may be. The television transmitting and receiving stations are kept in synchronism as regards their scanning mechanisms as in the usual way by means of transmitted synchronizing signals and since, of course, it is desirable that the operation of rotating the frame aerial or the search coil of the radiogoniometer at the receiving station shall not upset the synchronism between the two stations— i. e. since it is desirable that a strong synchronizing signal shall always be received whether or not the frame aerial or radiogoniometer search coil is adjusted to the direction of the transmitting station—means should be provided for ensuring that the reception of the synchronizing signal is substantially independent of the reception of what may be termed the directional television signal. This object may be achieved by providing the receiving station with a vertical aerial or its equivalent. Where the receiving station includes a pair of Bellini-Tosi aerials at right angles the vertical effect of these aerials may be employed. Such aerials, being non-directional, the synchronizing signals are received thereon and passed to the control circuit synchronizing the receiver. The directional television signals are received on the direction finding aerial set and passed therethrough to the picture modulating circuit. In such an arrangement the direction finding frame aerial or radiogoniometer is set to any position in which the received television picture may be clearly seen and the television picture "synchronized", "framed" and "phased" in the manner usual for television reception. Thereupon the frame aerial or radiogoniometer search coil is swung about until the intensity of the picture reaches a maximum or minimum value (as the case may be) this position giving the direction of the station being received. In this way synchronism between the transmitter and receiver is maintained despite movements of the radiogoniometer search coil or the frame aerial.

In an alternative arrangement applicable to cases where it is not convenient to separate the synchronizing signals from the directional picture signals a combined signal may be employed and this can be split into two parts at the receiver, one part being received continuously on the vertical aerial or its equivalent and being thus passed on at approximately constant amplitude to the synchronizing circuit, and the other part being received on the direction finding aerial system and thence passed on to the picture modulating circuit, the amplitude of this second part being, of course, dependent upon the direction in which the radiogoniometer search coil or frame aerial is pointing.

In the arrangements so far described the directional television signals i. e. the picture which may contain the name of the radio beacon station being received, will vary in intensity as the radiogoniometer search coil or frame aerial is rotated and it may in many cases be of practical advantage so to arrange matters that the name of the radio beacon is continuously received throughout the taking of the bearings. For this purpose the receiver station may be so arranged that the synchronizing signal and the name signals are received on a vertical aerial (or its equivalent having substantially no directional qualities) while a further signal, which is utilized to indicate direction, is received on the direction finding aerial system. In one arrangement of this kind an additional signal which is utilized to give direction readings is superimposed on the signals corresponding to the television image (e. g. a picture of the name of the beacon being received) and visible images corresponding to both signals are viewed simultaneously in the television viewing device; that is to say in addition to the picture which is characteristic of the radio beacon being received, there will also be a characteristic image or marking which varies in intensity in accordance with the orientation of the receiving directional apparatus. A superimposed signal for giving directional readings should, of course, be of such nature as not to render unintelligible the television signal proper, where the latter, for example, conveys an image for identification of the transmitting beacon.

In one arrangement in accordance with the last described proposal the superimposed signal provided for directional purposes consists of a single tone of approximately sine wave shape and of a frequency equal to an integral multiple of the scanning line frequency in the television picture. For purposes of convenience in description this single tone frequency will be referred to in the present specification as the directional frequency. Since the directional frequency is a multiple of the scan line frequency it will produce in the television receiver black bars or lines running across the picture, the said bars being vertical in the case of horizontal scanning and horizontal in the case of vertical scanning and dependent in number upon the integer by which the scan line frequency must be multiplied to give the directional frequency. The receiver is so arranged that the directional frequency signal will only be passed by that part of the receiving system to which the direction finding frame or its equivalent is coupled, while the total signals, including both the directional signal and the television signals, are passed through that part of the system to which the vertical aerial or its equivalent is coupled. In this way, once the receiver has been tuned in to any television signal, the television signal itself will be received at a substantially constant level of intensity from the vertical aerial or its equivalent. At the same time the orientation of the frame aerial and radiogoniometer search coil only affects the directional frequency and the images thereby occasioned. As an example, consider the case of a television transmission system operating with a scan line frequency of 300 cycles per second.

As is known, the energy transmitted through such a transmitter will be concentrated at the fundamental and at harmonics of the scan line frequency i. e. energy concentration will occur around 300 cycles, 600 cycles and 900 cycles and so forth. If the directional frequency be chosen at 900 cycles, and if this frequency be superimposed upon the signals giving a received television picture, then said frequency will result in three black bars running across the picture said bars being, of course, vertical in the case of horizontal scanning. If desired, that portion of the television signals having a frequency of 900 cycles may be eliminated from the spectrum of television frequencies by means of a suitable filter provided at the transmitter.

Of course, if desired, synchronism between transmitting and receiving stations may be effected by providing each with independent master time period devices, as nearly as possible alike and serving to control the scanning mechanisms. In such cases manually adjustable means as known per se should be provided at the receivers for adjusting synchronism.

Figure 1 of the accompanying drawings illustrates diagrammatically and schematically a preferred form of transmitting installation in accordance with this invention, this preferred form comprising in essence an omni-directional aerial and a revolving frame aerial. Figure 2 illustrates the nature of the picture which will be produced at a receiver of the signals transmitted from the transmitter of Figure 1; Figure 3 is a modified picture transmitter in which the scanning device, etc. of Figure 1 is replaced by a medium on which television signals have been recorded, and, Fig. 4 shows diagrammatically a preferred arrangement of the receiver.

Referring to Figure 1 the station comprises a continuously rotating frame aerial B which is rotated by means of a motor in any convenient manner. The rotating means are not shown. On the rotating shaft S upon which the frame aerial B is carried is mounted a drum A carrying a suitable scale the scale moving behind an indicator window W. The drum A is so positioned with respect to the window W that the scale reading given by a suitable pointer or line indicator incorporated in said window will correspond to the orientation of the frame aerial B i. e. when the direction of emission from the frame aerial B is northwards the scale reading will be north, and so on.

The portion of the scale at any instant behind the window W and the window itself is illuminated from a source of light C. Reflected light from the scale and window is projected through a Nipkow disc or other scanning device D upon a photoelectric cell E whose output is amplified by amplifiers $A_1$ and $A_2$ the amplified output being employed to modulate the carrier wave at M the modulated carrier wave being transmitted from an omni-directional aerial F. The aerial F transmits synchronizing impulses and television picture frequencies corresponding to the picture consisting of the window W and the scale behind it. In Fig. 1 the usual amplifier and modulator M are shown associated with the aerial F, a carrier frequency drive for example at 1,000 metres, being provided from a carrier frequency drive source CD. The drive source CD is also employed to provide the same carrier frequency which is modulated in a manner later to be described, this modulated carrier being transmitted from the aerial B. M' indicates a magnifier and modulator which is associated with the aerial B and which is driven with carrier frequency from CD. The modulations transmitted from the aerial B include a tone frequency which is primarily derived from the synchronizing winding of the synchronous motor G employed to drive the scanning device D which motor is driven or synchronized by means of the usual tuning fork arrangement schematically indicated at H. As will be seen voltages set up across the coil of the synchronizing fork unit H are applied betweeen grid and cathode of a valve $V_1$. If these voltages were used directly to modulate the carrier wave transmitted from the aerial B the result, at a receiving station having a television receiver and picking up signals both from aerials B and F, would be that a picture corresponding to the picture transmitted from the aerial F would be received this picture having superimposed thereon a black bar due to the signals transmitted from B said bar extending over the complete length of the picture. As part of this complete length of the picture is occupied by the scale markings on the rotating scale, a black bar extending over the whole length of the picture would partially obscure the scale and for this reason it is preferred so to arrange matters that the black bar is visible only over half the picture length. In the arrangement shown in Figure 1 this result is accomplished in the following manner:

The lower portion of the disc D i. e. the portion not used in connection with the scanning of the main television picture, is flood lighted from the lamp C, the light passing through the apertures in the disc when it is projected upon a second photoelectric cell K included in the grid circuit of a valve $V_2$ in cascade with the valve $V_1$. A mask I is provided, this mask being of such dimensions and so positioned that it extends over and masks out the area at the bottom of the disc, which is scanned by half the apertures thereof. In other words owing to the provision of the mask, light will pass to the photoelectric cell K only during one half of each revolution of the disc D. The valve $V_1$ includes in its plate circuit a neon lamp or other glow discharge lamp GL of such ignition voltage that it breaks down each time a synchronizing impulse is set up across the coil at H but, as will be apparent from the figure, the resulting pulses occurring when the lamp breaks down are not passed on to the valve $V_2$ except when the photoelectric cell K is conductive i. e. except when the light falls thereon. The output from the valve $V_2$ provides the modulated potentials which are fed to the modulater at M'.

Figure 2 of the accompanying drawings shows the type of picture which will be received at a receiving station picking up signals from a transmitting station as shown in Figure 1 and having a television receiving set whose scanning mechanism is synchronized with the scanning mechanism at the transmitting station. The view of Figure 2 can be regarded as an enlarged view of the picture at the window W of Figure 1. In Figure 2 the markings I correspond to the scale markings on drum A and letters NE indicate a compass bearing (northeast). P is a fixed pointer incorporated in the window and cooperating with the scale markings, the said pointer P projecting from an identification plate as indicated, said plate having marked thereon letters identifying the station in question. In Figure 2 these letters are TL. In the identification plate is a viewing slot SL through which appears the black bar due to the signals transmitted from the aerial B. The full length bar at the right hand edge of Figure 2 is due to the synchronizing impulses. When the signals from the aerial B pass through the receiving station the black bar will appear in the slot SL and thus a direct indication of the direction of the transmitting station will be given by the picture itself.

In the foregoing description and characteristic television picture which is employed for direction finding purposes is in all cases obtained by employing photoelectric cells or their equivalent for giving signals derived from an actual picture. In some cases this may involve practical difficulties since apparatus such as photoelectric cells and the high amplification amplifiers which are generally necessary to be employed in conjunction therewith, is somewhat delicate and expensive.

In some cases, therefore, it is preferred to avoid this difficulty and this may be accomplished by employing at the transmitter a record, such for example as a gramophone record which has been recorded with television signals such as would be obtained were a true television transmitting apparatus as described above employed. This gramophone or other record with associated pickup means is employed in substitution for the television scanning and associated mechanism proper. In other words, the present feature of the invention consists in providing at each transmitting station a record of such variations that if signals be transmitted from this record and be received by means of an ordinary television receiver the indication given by that receiver will be the required indication e. g. a picture representation as desired.

A record employed in carrying out this invention may be made in any convenient manner; for example a picture or other representation of the name of the station may be scanned by an ordinary television scanning apparatus and the resulting electrical variations in the output of a photoelectric cell actuated from such apparatus, may be utilized to actuate a suitable recording device for making the record. Preferably such a record may consist of a magnetized steel ribbon or the like upon which the electrical variations are recorded magnetically in the well known manner of the so-called "telegraphone". Alternatively the record may be a wax gramophone record made by any of the known processes employed for gramophone recording.

Figure 3 of the accompanying drawings illustrates broadly the "record television" features of the present invention.

Referring to Figure 3 the apparatus therein illustrated consists of a synchronous motor M which is arranged to drive the record PR and to operate at the required scanning line frequency, for example in a case in which there are to be ten scanning lines per picture and 12.5 pictures per second, the frequency will be 125 cycles per second. The signals upon the record are picked up in any convenient manner appropriate to the nature of that record and transmitted as if they were ordinary television signals as above described.

Preferably the motor M driving the record also drives a monitoring disc MD as shown in Figure 3 whereby the operator may check the operation of the apparatus to ensure that the appropriate signals are being transmitted as required.

When the record is a magnetic record consisting of a steel ribbon or the like (the case illustrated in Figure 3) the signals are picked up there-from by a pickup coil PUC similar to the pickup coil of an ordinary telegraphone and the output of this coil is fed to an amplifier PUA prior to transmission. The transmitting station also includes a tuning fork control unit FU of known arrangement and design for controlling the motor speed and if required a synchronous signal generator SSG may be provided whereby a synchronizing "bar" of correct form may be introduced into the appropriate amplifier circuit. In such an arrangement the output terminals of the tuning fork control unit FU are connected as shown to the terminals of the electric motor M to which are also connected the input or control terminals of the synchronizing signal generator SSG, the output side of this generator being connected or coupled to a suitable point in the amplifier PUA.

Of course, where the record employed is of the gramophone type a "gramophone" pickup would replace the magnetic coil or "telegraphone pickup" hereinbefore referred to.

It will be seen that an arrangement as illustrated in Figure 3 provides the substantial practical advantages of economy, reliability, freedom from the necessity of employing photoelectric cells and amplifiers of high gain at the transmitters, and ability easily to provide a powerful, regular and uniform emission of "television signals".

Having now described our invention what we claim is:—

1. A wireless direction or bearing finding system comprising a transmitting station including, a rotatable loop, a direction indicating picture on the periphery of a rotatable recording medium, means for rotating said loop and recording medium, a scanning device, a light source and a light sensitive cell and circuit arranged adjacent said recording medium cooperating with each other and with said recording medium to produce in said cell and circuit currents characteristic of said picture, a wave generating and modulating and radiating device of the non-directional type connected with said cell and circuit, a tone generator operable at a frequency which is a function of the rate at which said picture is converted into characteristic currents and wave generating and signal modulating means and amplifying means interposed between said tone generator and said loop.

2. A wireless directional signalling system comprising a transmitting station including, a direction indicating picture mounted on a drum, means for rotating said drum; a scanning disc, a light source and a light sensitive cell arranged adjacent said drum and cooperating therewith and with each other to produce in said cell impulses characteristic of said picture as scanned by said disc, means for maintaining constant the time ratio between a scanning operation and a revolution of said drum, a wave generating modulating and radiating device of the non-directional type connected with said cell, and a device for generating and directively radiating a tone frequency which is synchronized with the characteristic impulses.

3. A wireless directional system of the type in which the receiver is synchronized with the transmitter comprising a transmitting station including, a rotatable loop, a direction indicating picture mounted on a drum, means for synchronously rotating said loop and the picture on said drum; a rotatable scanning disc, a light source and a light sensitive cell arranged adjacent said drum and cooperating therewith and with each other to produce in a circuit connected with said cell impulses characteristic of said picture as scanned by said disc, a wave generating modulating and radiating device of the non-directional type connected with said circuit, a synchronous motor for driving said scanning disc, an electrical time period measuring device connected with said motor, means under control of the last said device for transmitting from said rotatable loop synchronizing signals, a motor driven time period measuring device at the receiver and means responsive to said synchronizing signals for controlling said device at the receiver.

4. A wireless direction finding system comprising, a transmitting system including a rotatable loop, a direction indicating picture mounted on a drum, means for rotating said loop and drum like amounts; a scanning disc, a light source and a light sensitive cell arranged adjacent said drum and cooperating with each other and with said drum to produce in a circuit connected with said cell impulses characteristic of said picture as scanned by said disc when rotated, wave generating amplifying and modulating means connected with said circuit, a non-directional aerial connected with said amplifying and modulating means, a tone generator, means for energizing the same at a rate which is a function of the rate of scanning of said picture, wave generating and modulating means coupled with the output of said tone generator, and a circuit coupling the output of said wave generating and modulating means to said loop aerial.

5. A wireless direction or bearing finding system comprising, a transmitting system including a rotatable loop, a direction indicating picture mounted on a drum, means for rotating said loop and drum like amounts; a scanning disc, a light source and a light sensitive cell arranged adjacent said drum and cooperating with said picture and with each other to produce in a circuit connected with said cell impulses characteristic of said picture as scanned by said disc when rotated, a synchronous motor for rotating said disc, amplifying and modulating means connected with said circuit, a non-directional aerial connected with said amplifying and modulating means, a tone generator, a driving means of constant frequency connected with said tone generator on the one hand and with said synchronous motor on the other hand, wave generating and modulating means coupled with the output of said tone generator, and circuit coupling the output of said wave generating and modulating means to said loop aerial.

6. A wireless direction or bearing finding system comprising, a transmitting system including a rotatable loop, a direction indicating picture mounted on a drum, means for rotating said picture and drum like amounts; a scanning disc, a light source and a light sensitive cell arranged adjacent said drum and cooperating with said picture and with each other to produce in a circuit connected with said cell impulses characteristic of said picture as scanned by said disc when rotated, a synchronous motor for rotating said disc, amplifying and modulating means connected with said circuit, a non-directional aerial connected with said amplifying and modulating means, a tone generator of the thermionic type, a driving means connected with said tone generator on the one hand and with said synchronous motor on the other hand, wave generating and modulating means coupled with the output of said tone generator, a circuit coupling the output of said generating and modulating means to said loop aerial and means cooperating with said disc and said light source for interrupting the connection between said driving means and said generator intermittently as said scanning disc is rotated.

7. A device as recited in claim 4 in which said wave generating means are energized from a common alternating current source.

8. A system as recited in claim 1 including means for impressing synchronizing impulses on the wave generating and radiating device of the non-directional type.

9. The method of directional signalling which includes the steps of producing non-directional wave energy, impressing on said non-directional wave energy, energy characteristic of direction indicating pictures, producing directional wave energy, and impressing on said directional wave energy modulations of constant frequency which are synchronized with the direction indicating elements in said picture.

10. The method of directional signalling which includes the steps of producing and radiating non-directional wave energy, impressing on said non-directional wave energy, energy characteristic of direction indicating pictures, producing directional wave energy, and intermittently impressing on said directional wave energy, modulations, of tone frequency, which are synchronized with the direction indicating elements in said picture, at a rate which is a function of the rate at which said characteristic energy is impressed on said non-directional wave energy.

11. The method of directional signalling which includes the step of producing light impulses characteristic of a direction indicating picture as scanned by a scanning device, producing a non-directional radiant energy field, producing modulating potentials characteristic of said light impulses, impressing said modulating potentials on said non-directional field, producing a tone frequency which is a function of the rate at which said picture is scanned, generating an additional wave, producing a directional radiant energy field with said additional wave, and impressing said tone frequency on said directional energy field.

12. The method of directional signalling which includes the step of producing light impulses characteristic of a direction indicating picture as scanned by a television scanning device, producing a non-directional radiant energy field, producing modulating potentials characteristic of said light impulses, impressing said modulating potentials on said non-directional field, producing a tone frequency which is a function of the rate at which said picture is scanned, generating an additional wave the frequency of which is equal to the frequency of said first wave, producing a directional radiant energy field with said wave, impressing said tone frequency on said directional energy field, and impressing synchronizing impulses on one of said fields.

13. In a radio beacon, a transmitting station comprising a rotatable directional loop antenna and an indicating drum mounted for rotation with said antenna, said drum having compass-point indicia on the periphery thereof, a television device having photo-electric translating means and a scanning system for producing a train of electrical impulses characteristic of a picture which comprehends a portion of the indicia of said drum, a wave generating, modulating and radiating device of the non-directional type connected with said television device, a tone generator operable at a frequency which is a function of the speed of rotation of said indicating drum, and means for generating and amplifying signals, means for radiating said signals from said loop antenna, and means for causing said signals to be modulated by said tone generator.

14. In a wireless direction finding system, a transmitting station having a rotatable directional aerial, a compass chart rotatable in synchronism with said aerial, television scanning and translating means for producing radio signals which are modulated in accordance with a moving image of said compass chart, means including a non-directional aerial for radiating said signals, a source of synchronizing signals connected to said rotatable aerial, a receiving station having directional and non-directional receiving antennae, and means under control of said synchronizing signals initiated at said transmitting station and collected by the non-directional antenna at said receiving station for causing said image signals, when received by said directional antenna, to become effective in producing at said receiving station an image of that part of the compass chart which corresponds to the direction in which one of said stations lies with respect to the other.

15. A direction finding system in accordance with claim 14 and having a station identifying picture adjacent said compass chart and within range of said television scanning means.

16. The method of directional signalling which includes the steps of producing and radiating non-directional wave energy, impressing on said non-directional wave energy modulations characteristic of direction indicating pictures, producing directional wave energy and intermittently impressing on said directional wave energy modulations of tone frequency, the last said modulations being synchronized with the repetition rate of the modulations of said non-directional wave energy.

HARRY MELVILLE DOWSETT.
LOUIS EDWARD QUINTRELL WALKER.
ROBERT CADZOW.